United States Patent [19]
Nakajima

[11] Patent Number: 5,426,712
[45] Date of Patent: Jun. 20, 1995

[54] METHOD AND APPARATUS FOR DESCRIBING A CHARACTER IMAGE BASED ON ITS CONTOURS, AND FOR CLASSIFYING THE CHARACTER IMAGE FOR CHARACTER RECOGNITION BASED ON A RESULTING CONTOUR-BASED DESCRIPTION OF THE CHARACTER IMAGE

[75] Inventor: Yuh Nakajima, Yokohama, Japan
[73] Assignee: Ricoh Company, Ltd., Tokyo, Japan
[21] Appl. No.: 47,411
[22] Filed: Apr. 19, 1993

[30] Foreign Application Priority Data
Apr. 20, 1992 [JP] Japan .................................. 4-099148

[51] Int. Cl.⁶ .......................... G06K 9/46; G06K 9/48
[52] U.S. Cl. ..................................... 382/199; 382/203
[58] Field of Search ................ 382/22, 25, 48, 56; G06K 9/48, 9/46, 9/20, 9/36

[56] References Cited
U.S. PATENT DOCUMENTS
4,183,013  1/1980  Agrawala et al. .................. 381/22
4,618,989 10/1986  Tsukune et al. ................... 382/22

Primary Examiner—Jose L. Couso
Attorney, Agent, or Firm—Popham, Haik, Schnobrich & Kaufman, Ltd.

[57] ABSTRACT

A code set includes a first type of code for indicating a maximal point of a contour of an image, and a second type of code for indicating a minimal point of the contour of the image. The code set may include a third type of code for indicating a state of a switching pair which is a pair of a maximal point and a minimal point on the contours. Each of contours of are described by arrangement of the first type code and the second type of code or a combination of the third code and the arrangement of the first type of code and the second type of code. Each of the first and second types of codes may comprises a convex type of code and a concave type of code, the convex type of code indicating the maximal point on the contour of a convex part of the image, and the concave type of code indicating the maximal point on the contour of a concave part of the image.

8 Claims, 20 Drawing Sheets

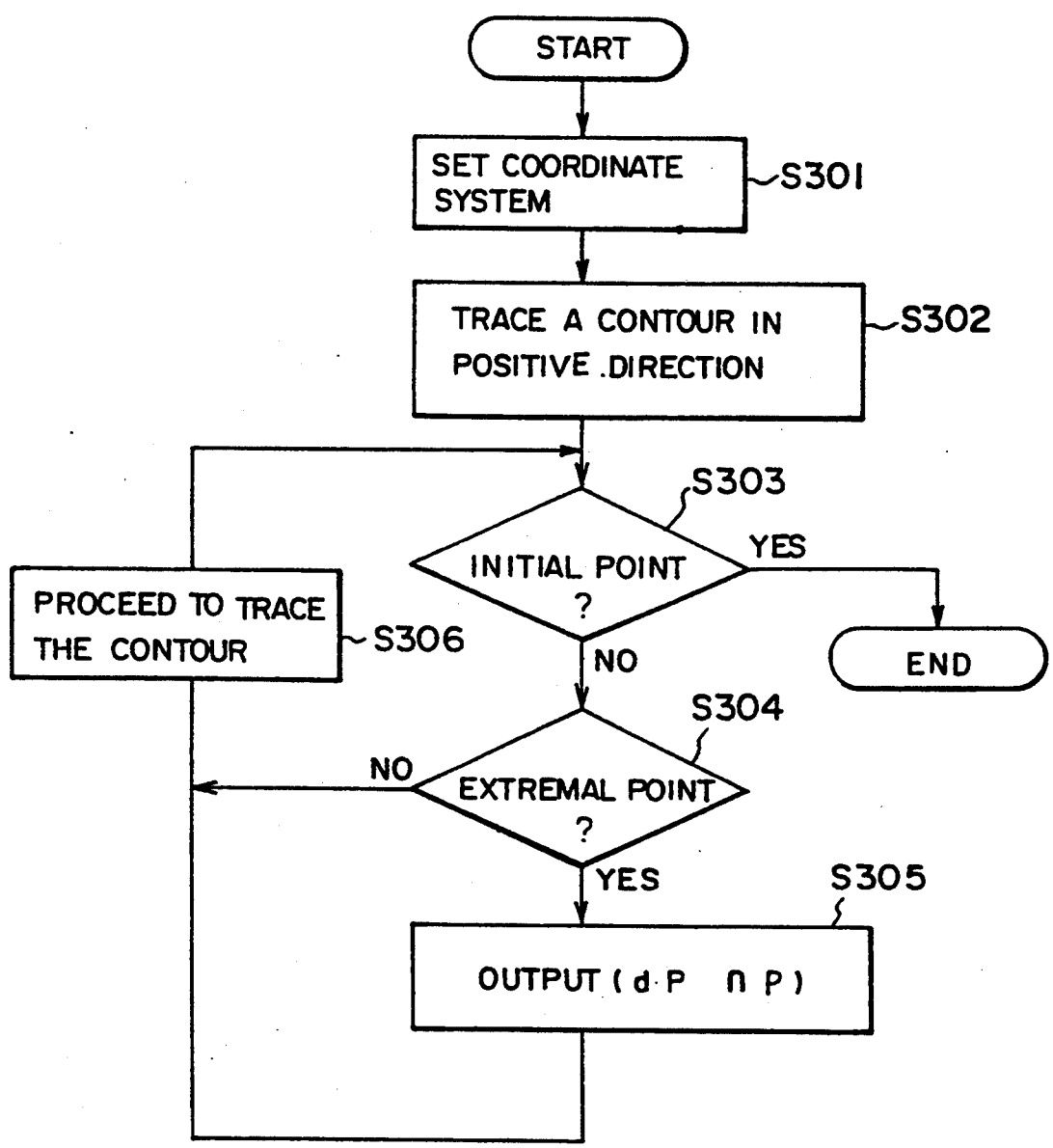

TYPE d

TYPE ∩

TYPE p

TYPY U dp

∩ ∪

∩ ∪

| 1 | 2 | 3 | 4 | 5 | 6 |
| d | p | ∩ | ∪ | d | p |

| r | sgn (r) | $\frac{|r|}{2}$ | $\left\lceil \frac{|r|}{2} \right\rceil$ | m |
|---|---|---|---|---|
| −4 | −1 | 2 | 2 | −2 |
| −3 | −1 | 1.5 | 2 | −2 |
| −2 | −1 | 1 | 1 | −1 |
| −1 | −1 | 0.5 | 1 | −1 |
| 0 | 0 | 0 | 0 | 0 |
| 1 | 1 | 0.5 | 1 | 1 |
| 2 | 1 | 1 | 1 | 1 |
| 3 | 1 | 1.5 | 2 | 2 |
| 4 | 1 | 2 | 2 | 2 | m = 1 m = 0 m = -1 m = 2

1 2 3 4 5 6 d p ∩ p d U    SWITCHING PAIR 6-3

1 2 3 4 5 6 d p ∩ U d p    SWITCHING PAIR 2-5

FIG. 28
```
1  2  3  4  5  6  7  8
d  p  d  p  d  U  ∩  U            SWITCHING PAIRS 4-1, 2-5
```
(A)　　　　　　　(B)　　　　　(C)
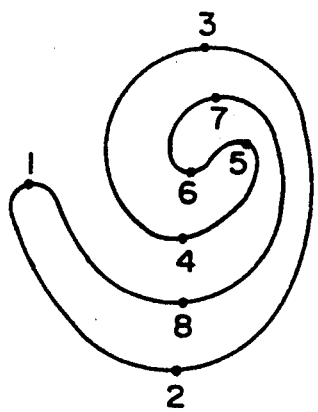　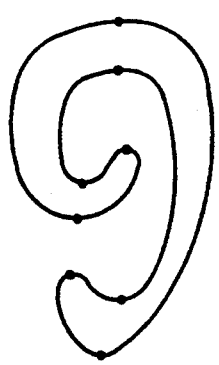　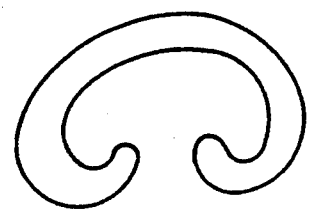
(-1, -1)　　　　(0, -1)　　　(1, -1)
(D)　　　　　(E)
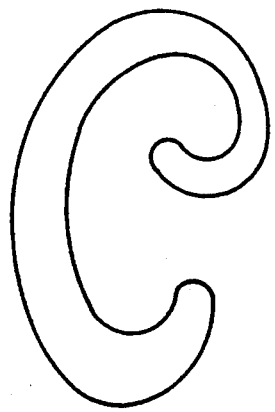　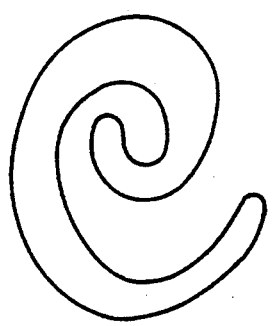
(1, 0)　　　　(1, 1)
FIG. 29
|  | CURL | | |
|---|---|---|---|
| 2-5<br>4-1 | -1 | 0 | 1 |
| -1 | 0 | x | x |
| 0 | 0 | x | x |
| 1 | 0 | 0 | 0 |
CURL 1 2 3 4 5 6 7 8 d p ∩ p d U ∩ p     SWITCHING PAIRS 6-3, 8-5

METHOD AND APPARATUS FOR DESCRIBING A CHARACTER IMAGE BASED ON ITS CONTOURS, AND FOR CLASSIFYING THE CHARACTER IMAGE FOR CHARACTER RECOGNITION BASED ON A RESULTING CONTOUR-BASED DESCRIPTION OF THE CHARACTER IMAGE

BACKGROUND OF THE INVENTION (1) Field of the Invention

The present invention generally relates to a code set including codes for describing a binary-valued image such as a character or a figure, and a method and system for describing an image using the code set.

(2) Description of the Related Art

Nowadays, there have been proposed various image description methods for describing images to store images in computers. The proposed image description methods are based on the types of images to be described and applied fields. For example, there are known, as methods for describing binary-valued images, a topological description method, a parameter description method and a chain-code description method. The topological description method is a rough description method which pays attention to the number of concatenation components of an image pattern and the number of holes in an image pattern. The parameter description method is capable of describing an image pattern in detail and completely preserving the shape of the contour of the image pattern. The chain-code description method is a practical method.

Further, a quasi-topological description method, a vertical topological description method (in Japanese Patent Application No.3-253186), and a sedin-code description method have been proposed. These methods are categorized between the rough description methods and the precise description methods. Due to the above description methods, it becomes to simplify algorithms for compressing and recognizing image data.

Normally, images includes various noises (e.g. shading off and break in lines). Hence, these noises must be eliminated from the images before a process for recognizing the image patterns. The following two types of noise cancelling methods are known.

The first type of noise cancelling methods is a filtering process in which pixel data is processed. The second type of noise cancelling methods is a process for eliminating noises after image data is summarized. Normally, the second type of noise cancelling methods is superior to the first type thereof in terms of the quality of computation, the operation speed and intelligence of the noise cancelling process itself. The second type of noise cancelling methods is suitable for the above mentioned vertical topological description method and the sedin code description method.

Further, there is a close relationship between the details of description and noise tolerance of the description. The topological description method is too rough to apply it to the character recognition. The parameter description method and the chain-code description method are too precise to apply these methods to the character recognition. Hence, a dictionary having a very large storage capacity and a very large amount of data processing are needed. Further, these method are liable to be affected by noises.

SUMMARY OF THE INVENTION

Accordingly, a general object of the present invention is to provide a novel and useful code set including codes for describing an image and a method and system for describing image using the code set in which the disadvantages of the aforementioned prior art are eliminated.

A more specific object of the present invention is to provide a code set by which the quantity of computation quired for describing an image can be decreased.

Another object of the present invention is to provide a code set by which the description of images suitable for noise cancelling and recognition of images can be obtained.

The above objects of the present invention are achieved by a code set comprising: a first type of code for indicating a maximal point of a contour of an image, said maximal point being defined as a domain A formed of one or a plurality points on the contour C of the image on an X-Y coordinate system satisfying conditions (1) and (2), $$\forall p \in A, y(p) = a \quad (1)$$

$$\exists N(A), \forall p \in N(A) \cap A^c \cap C, y(p) < a; \quad (2)$$

and a second type of code for indicating a minimal point of the contour of the image, said minimal point being defined as a domain A formed of one or a plurality of points on the contour C of the image on the X-Y coordinate system satisfying conditions (3) and (4), $$\forall p \in A, y(p) = a \quad (3)$$

$$\exists N(A), \forall p \in N(A) \cap A^c \cap C, y(p) > a, \quad (4)$$

in which conditions (1) through (4) p indicates a point on the contour, a is a constant, y(p) is a y-coordinate value of the point p, N(A) indicates a neighborhood of the domain A and $A^c$ indicates a complementary set of the domain A, and whereby the contour of the image is described by arrangement of said first type of code and the second type of code.

Another object of the present invention is to provide a method and system for describing images using the code set.

The objects of the present invention are achieved by a method for describing an image comprising the steps of: (a) extracting one or a plurality of contours of the image; (b) tracing each of said contours in a predetermined direction; (c) detecting a maximal point and a minimal point during said step (b), said maximal point being defined as a domain A formed of one or a plurality points on the contour C of the image on an X-Y coordinate system satisfying conditions (1) and (2), $$\forall p \in A, y(p) = a \quad (1)$$

$$\exists N(A), \forall p \exists N(A) \cap A^c \cap C, y(p) < a; \quad (2)$$

and said minimal point being defined as a domain A formed of one or a plurality of points on the contour C of the image on the X-Y coordinate system satisfying conditions (3) and (4), $$\forall p \in A, y(p) = a \quad (3)$$

$$\exists N(A), \forall p \in N(A) \cap A^c \cap C, y(p) > a, \quad (4)$$

in which conditions (1) through (4) p indicates a point on the contour, a is a constant, y(p) is a y-coordinate value of the point p, N(A) indicates a neighborhood of the domain A and $A^c$ indicates a complementary set of the domain A; and (d) arranging a first type of code indicating the maximal point and a second type of code indicating the minimal point in a detecting order of said first type of code and said second type of code in said step (c), whereby each contour of the image is described by arrangement of said first type of code and the second type of code.

The objects of the present invention are also achieved by a system for describing an image comprising: extracting means for extracting one or a plurality of contours of the image; tracing means for tracing each of said contours in a predetermined direction; detecting means for detecting a maximal point and a minimal point while said tracing means is tracing each of said contours, said maximal point being defined as a domain A formed of one or a plurality of points on the contour C of the image on an X-Y coordinate system satisfying conditions (1) and (2), $$\forall p \in A, \ y(p) = a \quad (1)$$

$$\exists N(A), \ \forall p \in N(A) \cap A^c \cap C, \ y(p) < a; \quad (2)$$

and said minimal point being defined as a domain A formed of one or a plurality of points on the contour C of the image on the X-Y coordinate system satisfying conditions (3) and (4), $$\forall p \in A, \ y(p) = a \quad (3)$$

$$\exists N(A), \ \forall p \in N(A) \cap A^c \cap C, \ y(p) > a, \quad (4)$$

in which conditions (1) through (4) p indicates a point on the contour, a is a constant, y(p) is a y-coordinate value of the point p, N(A) indicates a neighborhood of the domain A and $A^c$ indicates a complementary set of the domain A; and arrangement means for arranging a first type of code indicating the maximal point and a second type of code indicating the minimal point in a detecting order of said first type of code and said second type of code in said detecting means, whereby each contour of the image is described by arrangement of said first type of code and the second type of code.

According to the present invention, each contour of an image can be described using the first type of code indicating the maximal point on the contour and the second type of code indicating the minimal point on the contours. That is, the code set for describing an image is simple. Thus, the quantity of computation quired for describing an image can be decreased, and the description of images suitable for noise cancelling and recognition of images can be obtained.

Additional objects, features and advantages of the present invention will become apparent from the following detailed description when read in conjunction with the accompanying drawings.

BRIEF DESCRIPTION OF THE DRAWINGS

FIG. 10 is a flow chart illustrating a sub-process for computing dp codes for each contour.

FIG. 29 is a table illustrating curl values which can be combined with each other in a case shown in FIG. 28 (A), (B), (C), (D)and (E).

DESCRIPTION OF THE PREFERRED OF EMBODIMENTS

Figure 1:
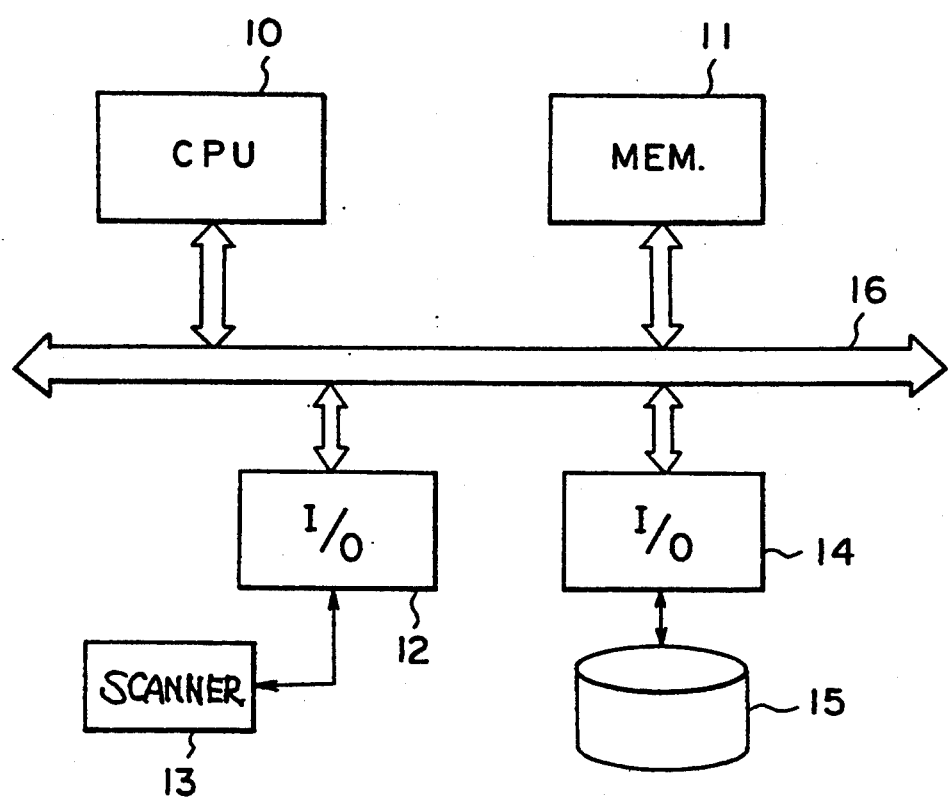
FIG. 1 is a block diagram illustrating a character recognition system.
Figure 2:
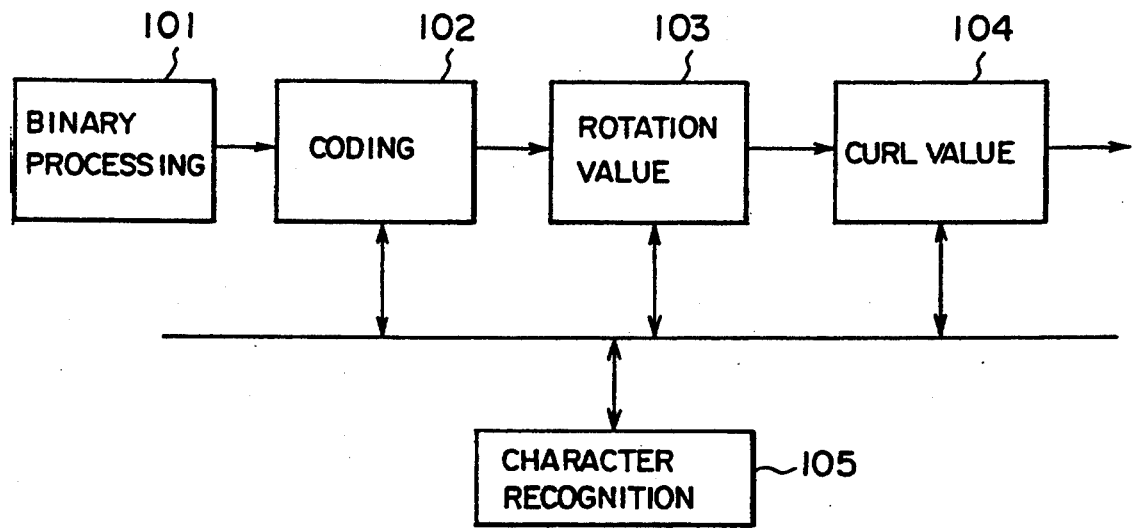
FIG. 2 is a block diagram illustrating a structure of a CPU shown in FIG. 1.

A description will now be given of an embodiment. FIGS.1 and 2 show a character recognition system suitable for recognizing hand-written characters. In this character recognition system, contours of a character image (which is a binary-valued image) are described by codes. The description method of images used in this character recognition system is rougher than the vertical topological description method which has been conventionally proposed.

Referring to FIG. 1. the character recognition system comprises a CPU (Central Processing Unit) 10, a memory 11, and interfaces 12 and 14 all of which are connected to each other by a system bus 16. The character recognition system further comprises a scanner 13 connected to the interface 12 and a data base unit 15 connected to the interface 14. The scanner 13 optically reads a document and outputs image signals. The image signals output from the scanner 13 is supplied to the CPU 10 via the interface 12. The data base unit 15 stores a dictionary used for recognizing characters. The CPU 10 uses the dictionary in the data base unit 15 via the interface 14. The image signal output from the scanner 13 is converted into binary-valued image data and stored in the memory 11 in accordance with instructions from the CPU 10. The CPU 10 has functions as shown in FIG. 2. The CPU 10 is provided with a binary processing portion 101, a coding portion 102, a first calculating portion 103, a second calculating portion 104 and a character recognition portion 105. The binary processing portion 101 is provided with binary-valued image data supplied from the interface 12 and extracts contours from a character image described by the binary-valued image data. The binary processing portion 101 further describes a relationship among the contours extracted thereby. The coding portion 102 computes a dp code (will be described later) for each contour extracted by the binary processing portion 101. The first calculating portion 103 calculating a rotation value (will be described later) based on the dp code obtained by the coding portion 102. The second calculating portion 104 calculates a curl value (will be described later) based on the rotation value obtained by the first calculation portion 103. The character recognition portion 105 carries out a character recognition process using the dictionary stored in the data base unit 15.

Figure 3:
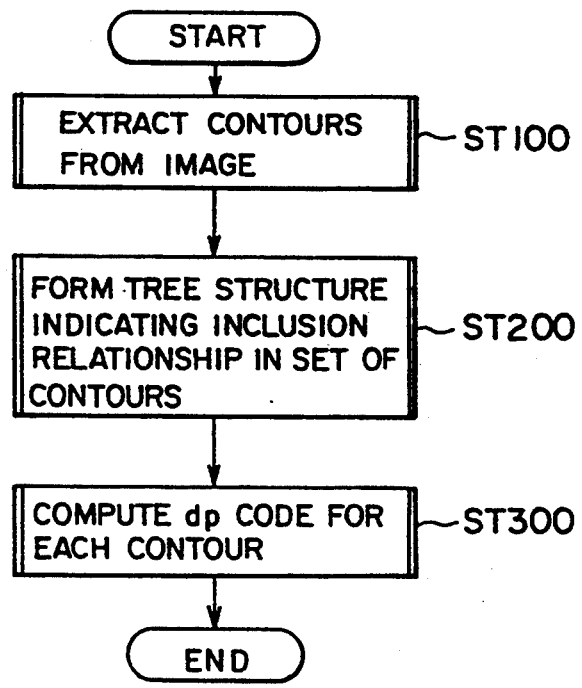
FIG. 3 is a flow chart illustrating a process for describing a contour of an image pattern.

The CPU 10 extracts features from a character image obtained by the scanner 13 in accordance with a procedure shown in FIG. 3. That is, the dp code describing contours of the character image is obtained in accordance with the procedure. A process in step ST100 for extracting contours from a character image is performed in the binary processing portion 101. A process in step ST200 for obtaining a tree structure indicating a relationship among the contours is performed in the binary processing portion 101, the relationship being referred to as an inclusion relationship in the set of contours. A process in step ST300 for computing the dp code for each contour is performed in the coding portion 102.

Figure 4:
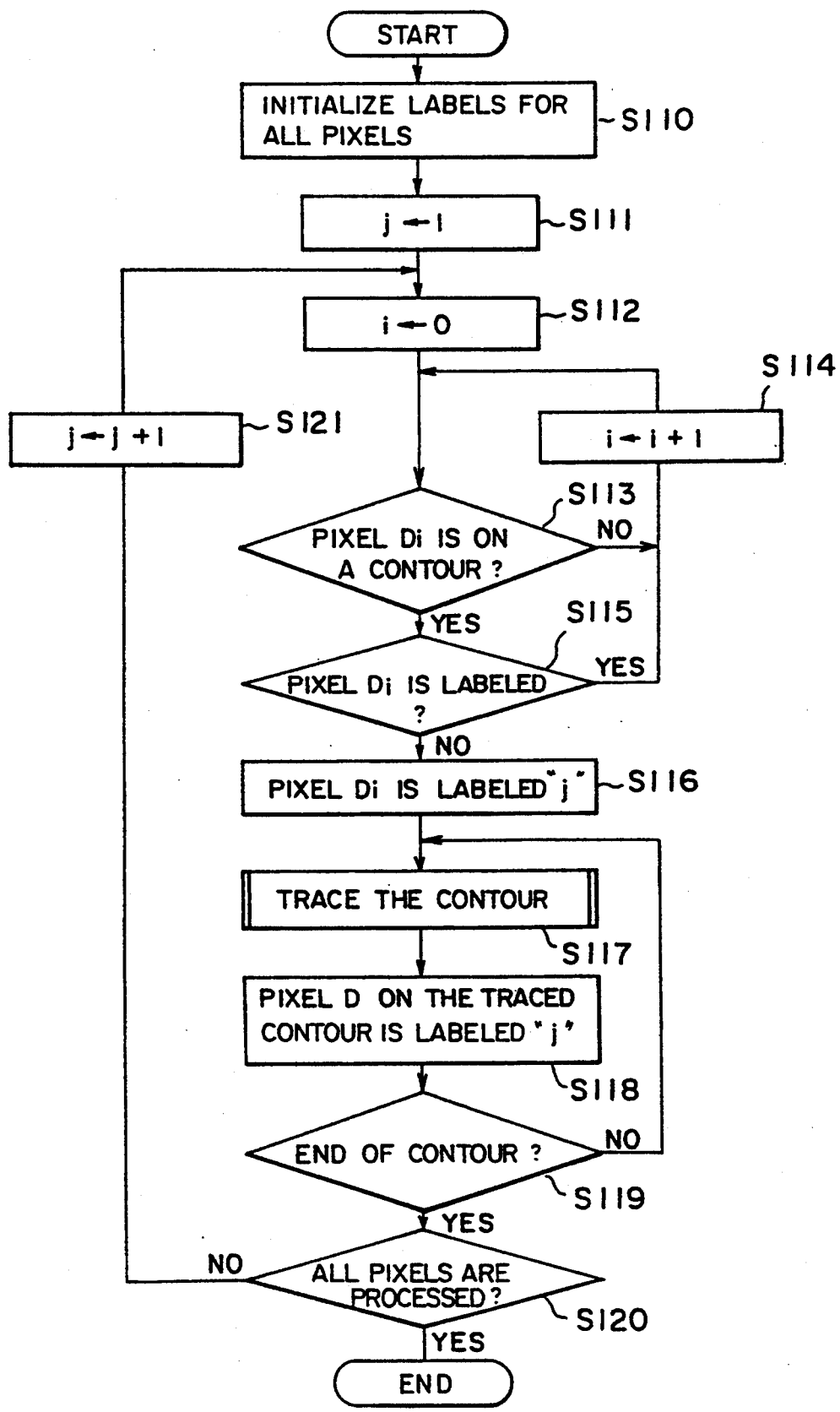
FIG. 4 is a flow chart illustrating a sub-process for extracting contours from an image patterns.

The process in step ST100 is performed as shown in FIG. 4. Referring to FIG. 4, in step S110, labels for all pixels forming binary-valued image data stored in the memory 11 are initialized. In step S111, an address counter j is initialized to "1", and in step 112, an address counter i is initialized to "0". After this, a pixel on a contour is searched. That is, it is determined, in step S113, whether or not the i-th pixel $D_i$ is on a contour of the character image. If the i-th pixel $D_i$ is not on a contour, the address counter i is incremented by one in step S114. Until a pixel on a contour is detected, steps S113 and S114 are repeated. While steps S113 and S114 are repeated, the binary-valued image data stored in the memory 11 is scanned in a predetermined order to cover all the pixel of the image. When it is determined, in step S113, that the i-th pixel is on a contour of the character image, it is further determined, in step S115, whether or not the i-th pixel $D_i$ detected in step S113 has been labeled. If the i-th pixel $D_i$ has been labeled, the above steps S113 and 114 are repeated again. On the other hand, when it is determined, in step 115, that the i-th pixel $D_i$ has not been yet labeled, the i-th pixel $D_i$ is labeled "j" in step 116. After this, the contour on which the i-th pixel $D_i$ is traced in step S117. In step S118, each pixel D on the contour is labeled "j", and it is then determined whether or not the trance reaches the starting point $D_i$, in step S119. When the trace has not yet reached the end of the contour, steps S117, S118 and S119 are repeated. As a result, all the pixels on the contour are labeled "j". When the trace reaches the end of the contour, it is determined, in step S120, whether or not all the pixels of the character image described by the binary-valued image data stored in the memory 11 have been processed. If all the pixels of the character image have not bee yet processed, the address counter j is incremented by one, in step S121. Then the above steps S112 through S120 are repeated so that all pixels on the next contour are labeled "j". When it is determined, in step S120, that all the pixels of the character image have been processed, the process for extracting the contours is completed.

Figure 5:
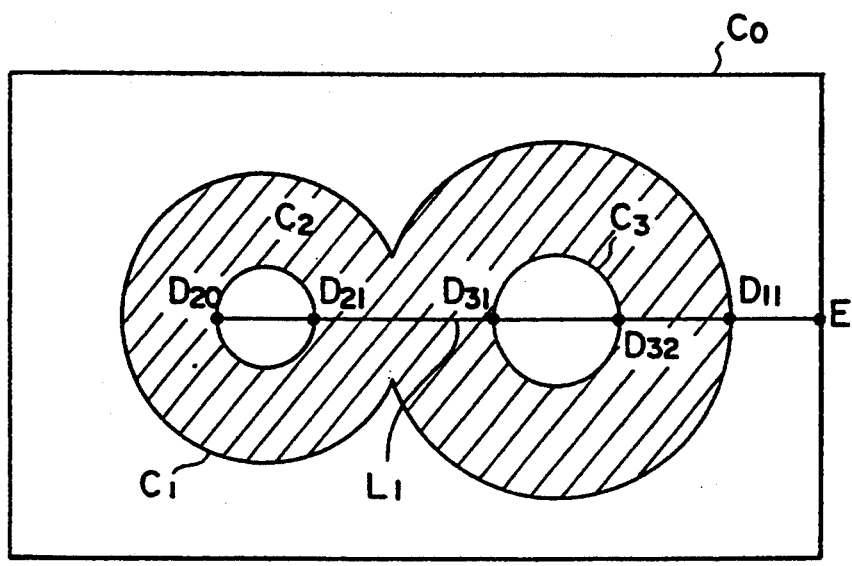
FIG. 5 is a diagram illustrating an image pattern and contours of the image pattern.

Due to the above process, for example, contours C1, C2 and C3 of a character image as shown in FIG. 5 are labeled "1", "2" and "3". When the process for extracting the contours is completed, the process for obtaining a tree structure indicating an inclusion relationship in the set of contours extracted by the process in step ST100.

Figure 7:
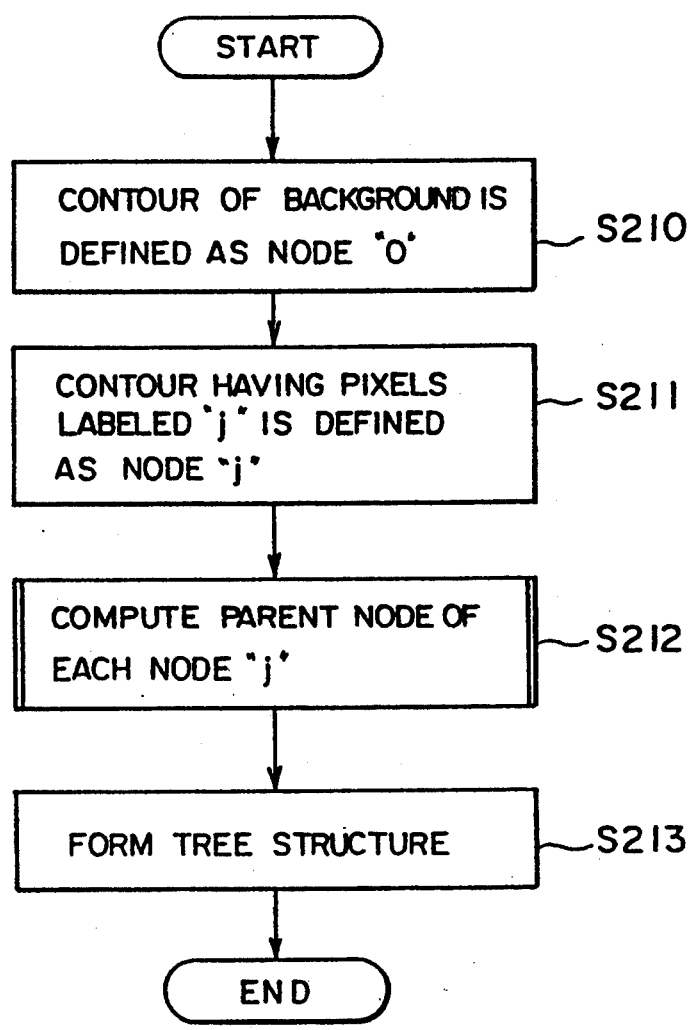
FIG. 7 is a flow chart illustrating a sub-process for forming a tree structure indicating a conclusion relation ship in a set of contours of an image pattern.

The process for obtaining the tree structure of the contours is performed in accordance with a flow chart shown in FIG. 7. Referring to FIG. 7, in step S210, a contour of a background is defined as a node "0". The contour of the background corresponds to edges of an image area as shown by C0 in FIG. 5. In step S211, a contour formed of pixels each of which has been labeled "j" is defined as a node "j". Thus, the contour C1, C2 and C3 shown in FIG. 5 are defined as nodes "1", "2" and "3". After nodes of all the contours extracted in the process shown in FIG. 4 are obtained, a parent node of each of nodes is computed, in step S212.

Figure 8:
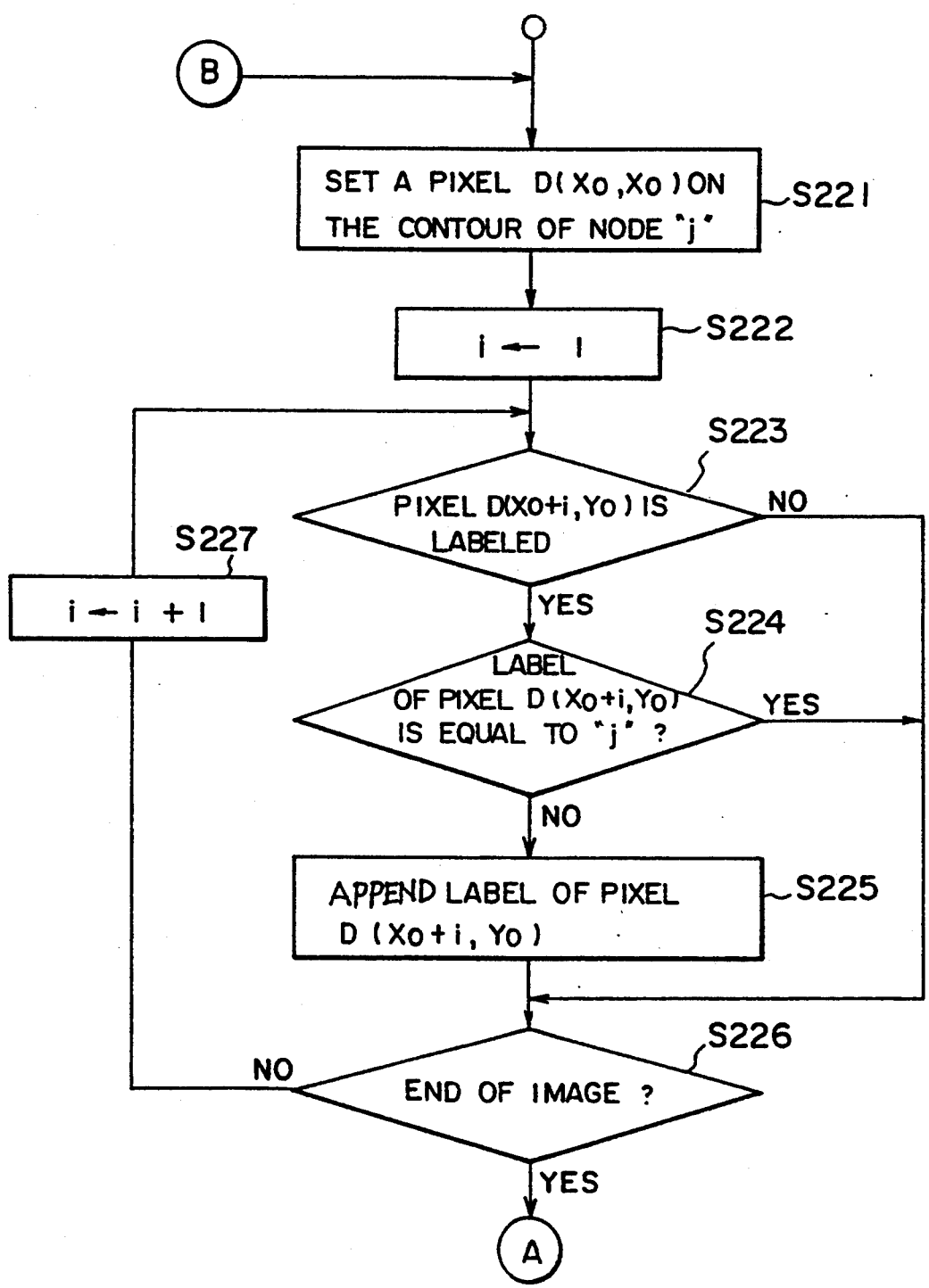
FIGS. 8 and 9 are flow chart illustrating a sub-process for computing a parent node of each node corresponding to a contour.
Figure 9:
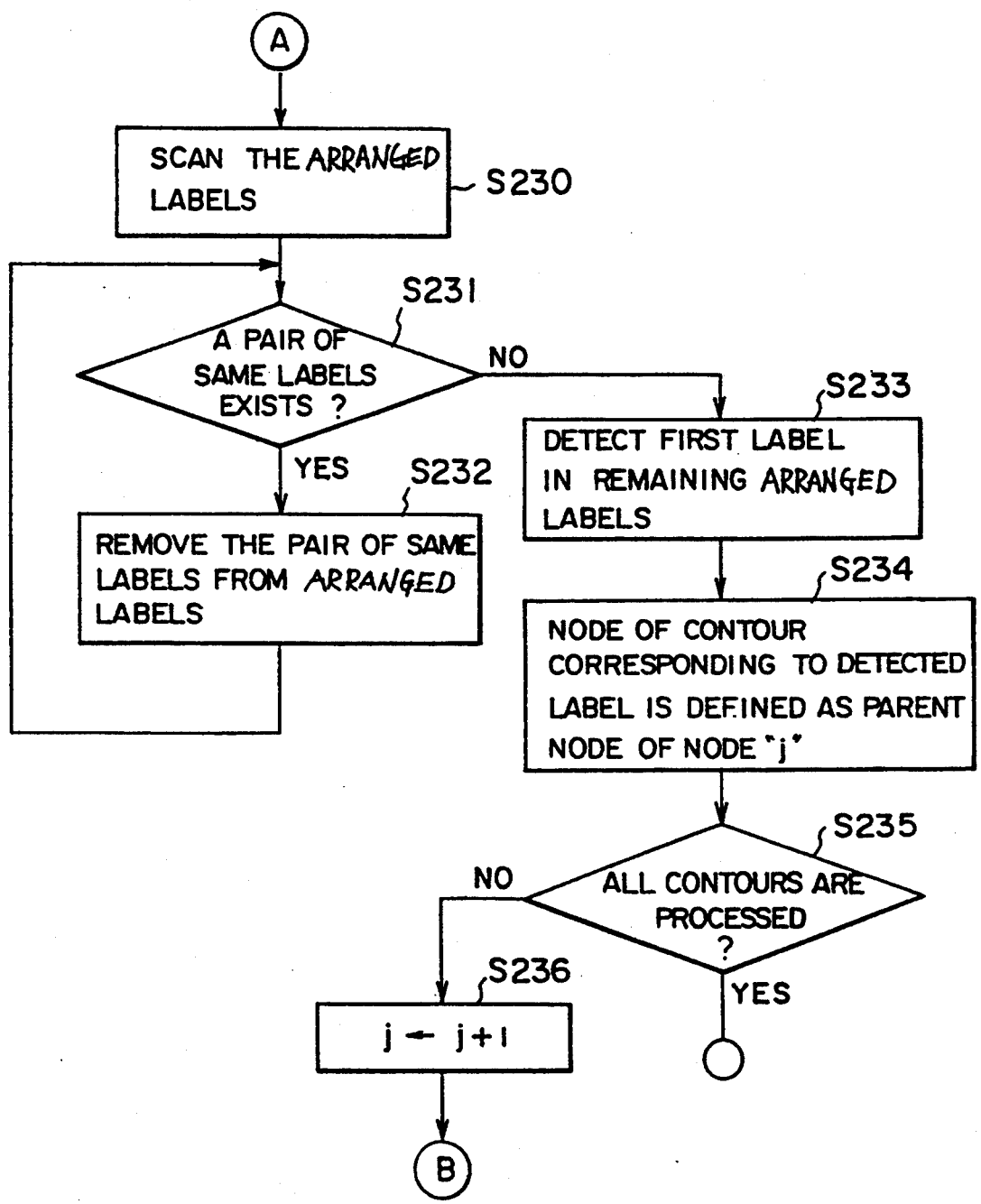

In step S212, a process shown in FIGS. 8 and 9 is performed. Referring to FIG. 8, in step S221, a pixel $D(X_0, Y_0)$ is set on the contour of the node "j". At this time, in step S221, the one-dimensional data in the register in which the labels are to be stored is also intinalized. In a case of FIG. 5, for example, a pixel $D_{20}$ is set on the contour C2 of the node "2". Hereinafter, the case of FIG. 5 will be described. An address counter i is set to one, in step S222, and it is determined, in step S223, whether or not a pixel $D(X_0+i, Y_0)$ is labeled. If the pixel $D(X_0+i, Y_0)$ is not labeled, that is, the pixel $D(X_0+i, Y_0)$ is not on any contours, the process proceeds to step S226. In step S226, it is determined whether or not the pixel $D(X_0+i, Y_0)$ is an end (E) of the image. If the pixel $D(X_0+i, Y_0)$ is not the end (E) of the image, the address counter i is incremented by one, in step 227. After this, until a pixel labeled is detected, the above process is repeated incrementing the address counter i one by one. That is, pixels on a horizontal line L which starts from the pixel $D_{20}(X_0, Y_0)$ are successively scanned. When a pixel $D_{21}$ labeled "2" is detected in step S223, it is determined, in step S224, whether or not the label of the pixel $D_{21}$ is equal to the label "2" of a pixel on the contour C2. As the pixel $D_{21}$ is on the contour C2 in this case, the process proceeds from step S224 to step S226. After this, pixels on the horizontal line L are scanned in the same manner as the above process. When a pixel $D_{31}$ labeled "3" on the contour C3 is detected, it is determined, in step S224, that the label of the pixel $D_{31}$ is not equal to the label "2" of a pixel on the contour C2. In this case, the label "3" of the pixel $D_{31}$ is appended to a one-dimentional arrangement of data in a register, in step S225. After this, while pixels on the horizontal line L are being scanned incrementing the address counter i one by one, the label "3" of a pixel $D_{32}$ and the label "1" of a pixel $D_{11}$ are successively appended to the register in the same manner as that of the pixel $D_{31}$. At this time, the labels "3", "3", and "1" have been appended to the register in this order. After the label "1" of the pixel $D_{11}$ is appended to the register in step S225, when a pixel $D(X_0+i, Y_0)$ reaches the end (E) of the image (a pixel on the contour C0 of the background), the process proceeds from step S226 to step S230 shown in FIG. 9. In step S230, the labels "3", "3", and "1" appended in this order to the register are scanned. It is then determined whether or not a pair of the same labels arranged adjacent to each other exists in the labels stored in the register, in step S231. In this example, as the labels "3" and "3" are arranged adjacent to each other, in step 232, the pair of the labels "3" and "3" are removed from the labels "3", "3" and "1" in the register. As a result, only the label "1" remains in the register.

After this, as there is no pair of the same labels in the register, the process proceeds from step S231 to S233. In step S233, the first label is detected in the remaining labels in the register. The first label is a label which has been appended at the earliest time among the remaining labels in the register. As only the label "1" remains in the register in this example, the level "1" is detected in step S233. After the first label is detected, in step S234, a node "1" of the contour C1 corresponding to the label "1" detected in step S233 is defined as a parent node of the node "2" corresponding to the contour C2. If there is no label in the register, the parent node of node "j" is set to node "0" (the background node). When the parent node of the node "j" is defined, it is determined, in step S235, whether or not all the contours are processed. If the all the contours have been not yet processed, an address counter j is incremented by one in step S236, and the process returns from step S236 to step S221 shown in FIG. 8. That is, a parent node of a node corresponding to the next contour is defined in the same manner as that in the above case. If all the contours have been processed, the process in step S212 shown in FIG. 7 for computing the parent node of each node "j" is completed.

According to the above process, the following relationships among contours C1, C2 and C3 are obtained.
1) The node "1" corresponding to the contour C1 is the parent node of the node "2" corresponding to the contour C2.
2) The node "1" corresponding to the contour C1 is the parent node of the node "3" corresponding to the contour C3.
3) The node "0" corresponding to the contour C0 of the background is the parent node of the node "1" corresponding to the contour C1.

Figure 6:
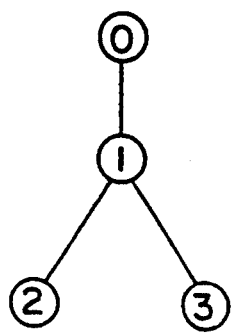
FIG. 6 is a tree structure indicating a conclusion relationship in a set of contours of the image pattern shown in FIG. 5.

Returning to FIG. 7, after the above relationships are obtained, in step S213, a tree structure representing the above relationships 1), 2) and 3) among the contours C0, C1, C2 and C3 are formed as shown in FIG. 6. The tree structure shown in FIG. 6 is one of features describing the image (corresponding to a hand-written numeral "8") shown in FIG. 5.

The process, shown in FIG. 3, for computing the dp code for each contour is performed in accordance with a flow chart shown in FIG. 10.

Figures 11A, 11B, 11C:
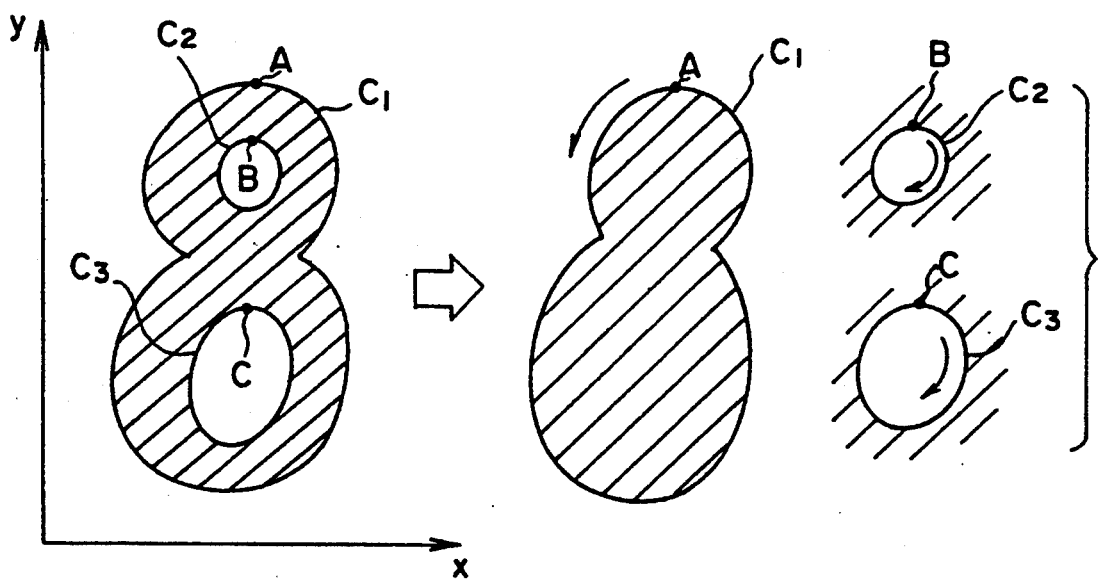
FIGS. 11A, 11B and 11C are diagrams illustrating examples of contours forming a numeral.

Referring to FIG. 10, in step S301, a predetermined a coordinate system, for example, an X-Y coordinate system is set with respect to a binary-valued image as shown in FIG. 11A. The image corresponds to the hand-written numeral "8", and three contours C1, C2 and C3 has been extracted from the binary-valued image shown in FIG. 11A in accordance with the above process. In step 302, one of the contours, for example, the contour C1 is selected, and the contour C1 is traced from a start point A in a direction shown by an arrow in FIG. 11B point by point. A direction in which a contour is traced under a condition in which the interior of the image is always positioned at the left side of each point on the contour is defined as a positive direction. A direction opposite to the positive direction is defined as a negative direction. That is, the contour C1 is traced from the starting point A in the positive direction. While the contour C1 is being traced in the positive direction, in step S303, it is determined whether or not the present point on the contour C1 is the starting point A. If the present point is not the starting point A, it is determined, in step S304, whether or not the present point on the contour C1 is an extremal point. If the present point is not extremal point, the contour C1 is traced by one point in step 306. After this, until the extremal point is detected, the contour C1 is continuously tranced in accordance with steps S303, S304 and S306.

A maximal point and a minimal point are defined as the extremal point as follows.

For a contour C, in a connected closed domain A on the contour C satisfies the following conditions (1) and (2), A is called the maximal point.

$$\forall p \in A, y(p) = a \text{ (a is a constant)} \quad (1)$$

$$\exists N(A), \forall p \in N(A) \cap A^c \cap C, y(p) < a \quad (2)$$

Figure 12A:
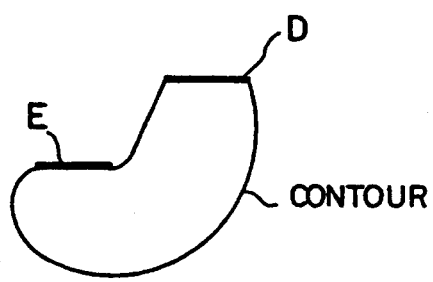
FIG. 12A and 12B are diagrams illustrating examples of domains included in a concept of an extremal point.

($A^c$ is a complementary set of A)
Due to the above definition, a point having a y-coordinate value which is local maximum thereof on the contour C is the maximal point. In addition, closed domain D as shown in FIG. 12A is also defined as the maximal point. The closed domain E is not the maximal point.

For a contour C, in a connected closed domain A on the contour C satisfies the following conditions (1) and (2), A is called the minimal point.

$$\forall p \in A, y(p) = a \text{ (a is a constant)} \quad (1)$$

$$\exists N(A), \forall p \exists N(A) \cap A^c \cap C, y(p) > a \quad (2)$$

Figure 12B:
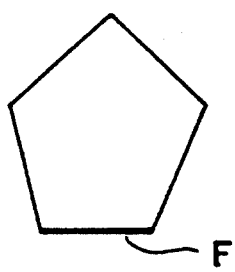

($A^c$ is a complementary set of A)
Due to the above definition, a point having a y-coordinate value which is local minimum thereof on the contour C is the minimal point. In addition, a closed domain F as shown in FIG. 12B is also defined as the minimal point.

The extremal point is classified into the following four types, such as d, p, ∩, and ∪.

Figure 13A:
FIGS. 13A, 13B, 13C and 13D are diagrams illustrating types of the extermal point.
Figure 13C:
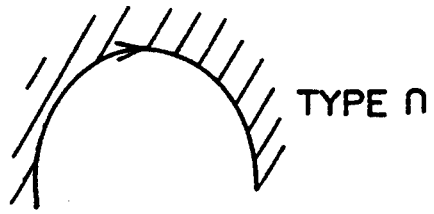
Figure 13B:
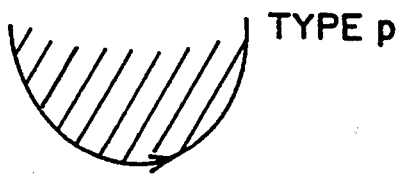
Figure 13D:
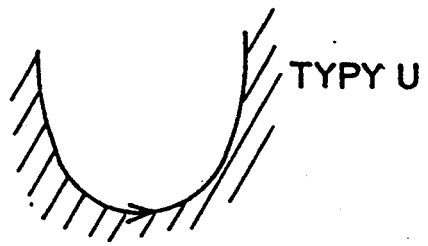

The type d of the extremal point is the maximal point from which the interior of the image extends downward in a neighboring area thereof, as shown in FIG. 13A. The type p of the extremal point is the minimal point from which the interior of the image extends upward in a neighboring area thereof, as shown in FIG. 13B. The type ∩ of the extremal point is the maximal point from which the interior of the image extends upward in an neighboring area thereof, as shown in FIG. 13C. The type ∪ of the extremal point is the minimal point from which the interior of the image extends downward in an neighboring are thereof, as shown in FIG. 13D. The types p and d of extremal points are called convex extremal points. The types ∩ and ∪ of extremal points are called concave extremal points.

Figure 14A:
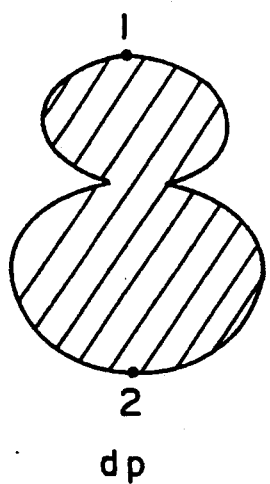
FIGS. 14A, 14B and 14C are diagrams illustrating codes describing contours.

Returning to FIG. 10, when an extremal point is detected in step S304, in step S305, a type to which the selected extremal point belongs is selected from the four types d, p, ∩ and ∪. After this, the above process are repeated. When the present point on the contour C1 has reached the starting point A, the process for the contour C1 is completed. In a case of the contour C1 as shown in FIG. 11A, two extremal points 1 and 2 are detected, and the types d and p are respectively selected for the extremal points 1 and 2, as shown in FIG. 14A. While the contour C1 is being traced in the positive direction, first the extremal point 1 which is the type d is detected, and next, the extremal point 2 which is the type p is detected. Thus, the contour C1 is described by symbols d and p arranged in this order. That is, a code (d p) describe the contour C1.

Figure 14B:
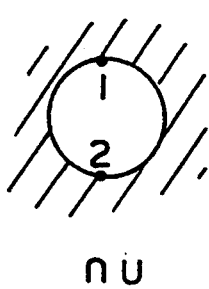
Figure 14C:
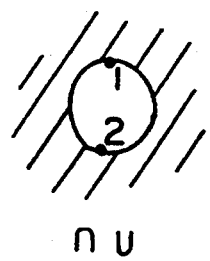

After the code (d p) describing the contour C1 is obtained, the remaining contours C2 and C3 as shown in FIG. 11B are traced in the positive direction in the same manner as the contour C1. As a result, extremal points 1 and 2 which are to belong to the types ∩ and ∪ are detected as shown in FIGS. 14B and 14C. Thus, each of the contours C2 and C3 is described by a code (∩ ∪).

The character image corresponding to the numeral "8" is described by the combination of the codes (d p), (∩ ∪) and (∩ ∪). This combination is made with reference to the tree structure shown in FIG. 6. For example, a code [dp(∩ ∪,∩ ∪)] obtained by the combination of the codes (d p), (∩ ∪), (∩ ∪) describes the character image corresponding to the numeral "8" having the contours C1, C2 and C3.

Other examples will be described below.

Figure 15:
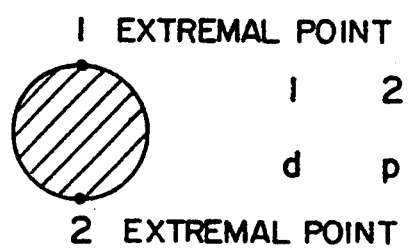
FIGS. 15 and 16 are diagrams illustrating codes describing images.
Figure 16:
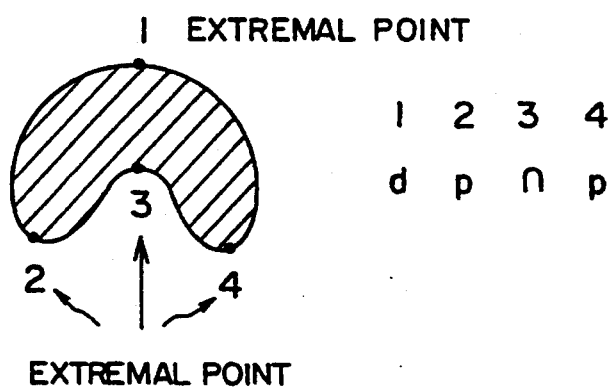
Figure 17A:
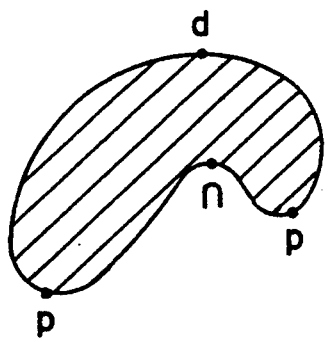
FIGS. 17A and 17B are diagrams illustrating images described by the same code.
Figure 17B:
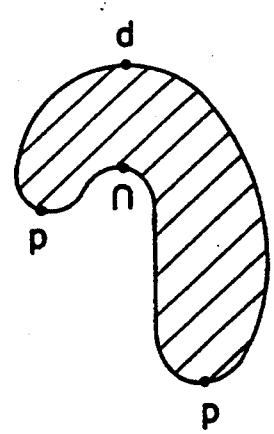

In an image shown in FIG. 15, extremal points 1 and 2 are detected on a contour of the image, and the contour is described by a code (d p). In an image shown in FIG. 16, extremal points 1, 2, 3 and 4 are detected on a contour of the image, and the contour is described by a code (d p ∩ p). That is, the images shown in FIGS. 15 and 16 are distinguished from each other. In images shown in FIGS. 17A and 17B, four extremal points are detected on respective contours, and the contours are described by the same code (d p ∩ p). That is, the images shown in FIGS. 17A and 17B is not distinguished from each other.

According to the description method using the dp code as described above, an image can be described in detail more than the conventional topological description method since the images shown in FIGS. 15 and 16 are not distinguished from each other by the conventional topological method. In addition, the description of the image using the dp code is rougher than the conventional vertical-topological description method.

The coordinate system to be set with respect to images is not limited to the X-Y coordinate system shown in FIG. 11A. Another X-Y coordinate system in which X and Y axes extend in other directions, and other coordinate system can be set with respect to images. In addition, the extremal points can be defined using an X-coordinate value P(X) of each point P.

To classify the code describing the contour of the image in further detail, the rotation value or the curl value is used for describing the contour. The rotation value and the curl value are respectively calculated by the first calculating portion 103 and the second calculation portion 104.

For two extremal points a and b on a contour, numbers $N_+(a;b)$ is defined as follows;

$$N_+(a;b) = N_{+pd} - N_{+\cap\cup}$$

where $N_{+pd}$ is the number of convex extremal points (p and d) obtained when the contour is traced in the positive (+) direction from the extremal point a to the extremal point b, and $N_{+\cap\cup}$ is the number of concave extremal points (∩ and ∪) obtained when the contour is traced in the positive (+) direction from the extremal point a to the extremal point b. The number of the extremal points a and b is not included in both $N_{+dp}$ and $N_{+\cap\cup}$.

For two extremal points a and b on a contour, numbers $N_-(a;b)$ is defined as follows;

$$N_-(a;b) = N_{-pd} - N_{-\cap\cup}$$

where $N_{-pd}$ is the number of convex extremal points (p and d) obtained when the contour is traced in the negative (−) direction from the extremal point a to the extremal point b, and $N_{-\cap\cup}$ is the number of concave extremal points (∩ and ∪) obtained when the contour is traced in the negative (−) direction from the extremal point a to the extremal point b. The number of the extremal points a and b is not included in both $N_{-dp}$ and $N_{-\cap\cup}$.

Figure 18:
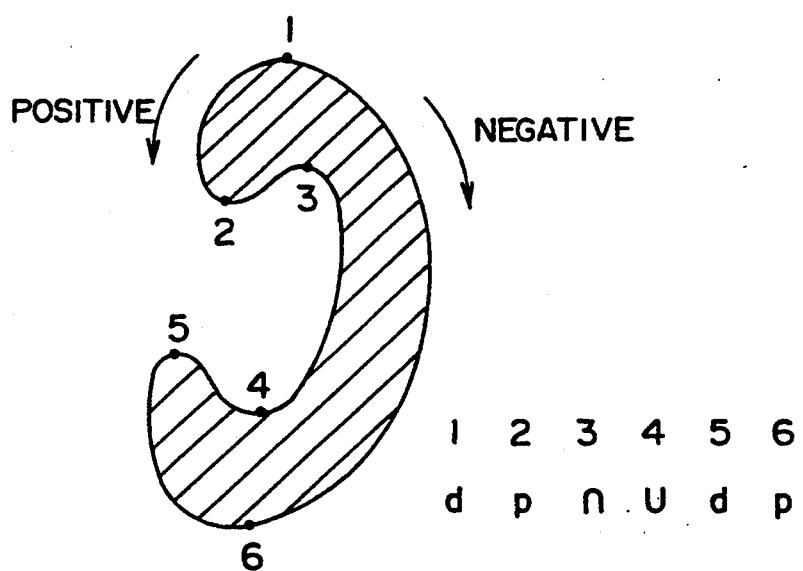
FIG. 18 is a diagram illustrating an image described by a code.

In an image as shown in FIG. 18, when the contour is traced from an extremal point 1 to an extremal point 4 in the positive direction, only one convex extremal point 2 (the type p) is obtained. When the contour is traced from the extremal point 1 to the extremal point 4 in the positive direction, only one concave extremal point 3 (the ∩ type) is obtained. Thus, for the extremal points 1 and 4 on the contour, $$N_+(1;4) = 1 - 1 = 0$$

is obtained. In addition, when the contour is traced from the extremal point 1 to the extremal point 4 in the negative direction, two convex extremal points 6 and 5 (the types p and d) are obtained. When the contour is traced from the extremal point 1 to the extremal point 4 in the negative direction, no concave extremal point is obtained. Thus, for the extremal points 1 and 4 on the contour, $$N_-(1;4) = 2 - 0 = 2$$

is obtained.

When a pair of extremal points a and b satisfies all the following conditions (1), (2), (3) and (4), the pair of the extremal points a and b is referred to as a switching pair a-b.

(1) $N_+(a;b) = \pm 2$ (either $+2$ or $-2$)
(2) $N_-(a;b) = \pm 2$ (either $+2$ or $-2$)

(3) The extremal point a belongs to either the type ∪ or p.

(4) The extremal point b belongs to either the type ∩ or d.

In the image shown in FIG. 18, a pair of the extremal points 2 and 5 is the switching pair 2-5. That is, the extremal points 2 and 5 satisfy the above conditions (1), (2), (3) and (4) as follows.

(1) $N_+(2;5) = -2$
(2) $N_-(2;5) = +2$
(3) The extremal point 2 belongs to the type p
(4) The extremal point 5 belongs to the type d.

Figure 19A:
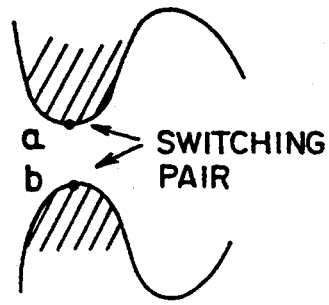
FIGS. 19A and 19B are diagrams illustrating switching pairs.
Figure 19B:
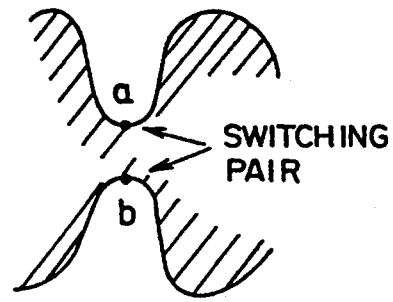

Pairs of the extremal points a and b as shown in FIGS. 19A and 19B are the switching pairs a-b. For each switching pair a-b, the curl value which will be described later is calculated by the second calculating portion 104.

The rotation value is calculated as follows.

Figure 20:
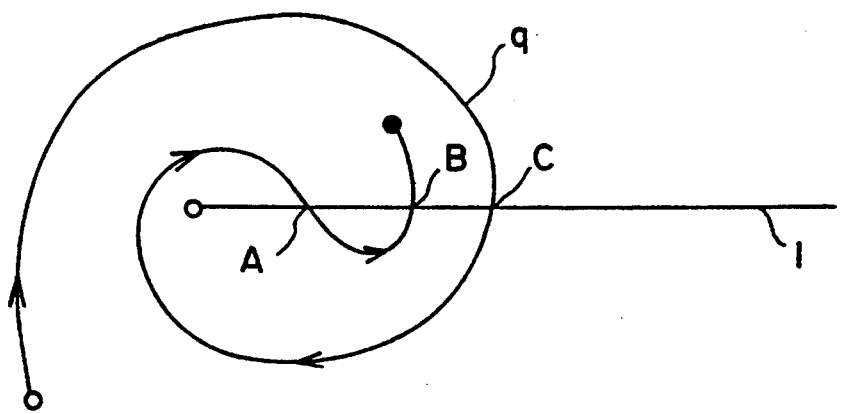
FIGS. 20, 21, 22 and 23 are diagrams illustrating how to obtain a rotation value r.
Figure 21:
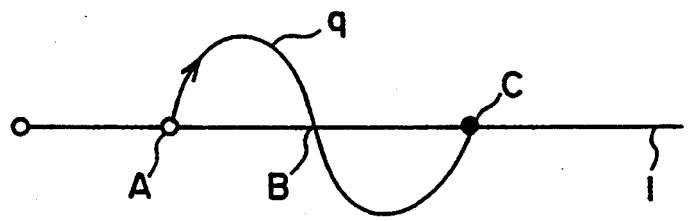

For an oriented curve q and a vertical half-line 1, a value U(1,q) is defined as follows;

$$U(1,q) = u - d$$

where u is the number of times that the curve q crosses the half-line 1 upward, and the d is the number of times that the curve q crosses the half-line 1 downward. In an example as shown in FIG. 20, the number of times that the curve q crosses the half-line 1 upward is one at a point B (u=1), and the number of times that the curve q crosses the half-line 1 downward is two at points A and C (d=2). Thus, the value U(1,q) is equal to −1. Even if the half-line 1 crosses the curve q at an starting point A of the oriented curve q, as shown in FIG. 21, the starting point A of the oriented curve q is not regarded as a point at which the half-line 1 crosses the curve q. When the half-line 1 crosses the curve q at the end point C of the curve q as shown in FIG. 21, the end point C is counted as a point at which the half-line 1 crosses the curve q. Thus, the value U(1,q) for the half-line 1 and the curve shown in FIG. 21 is equal to "0" (1−1=0).

Figure 22:
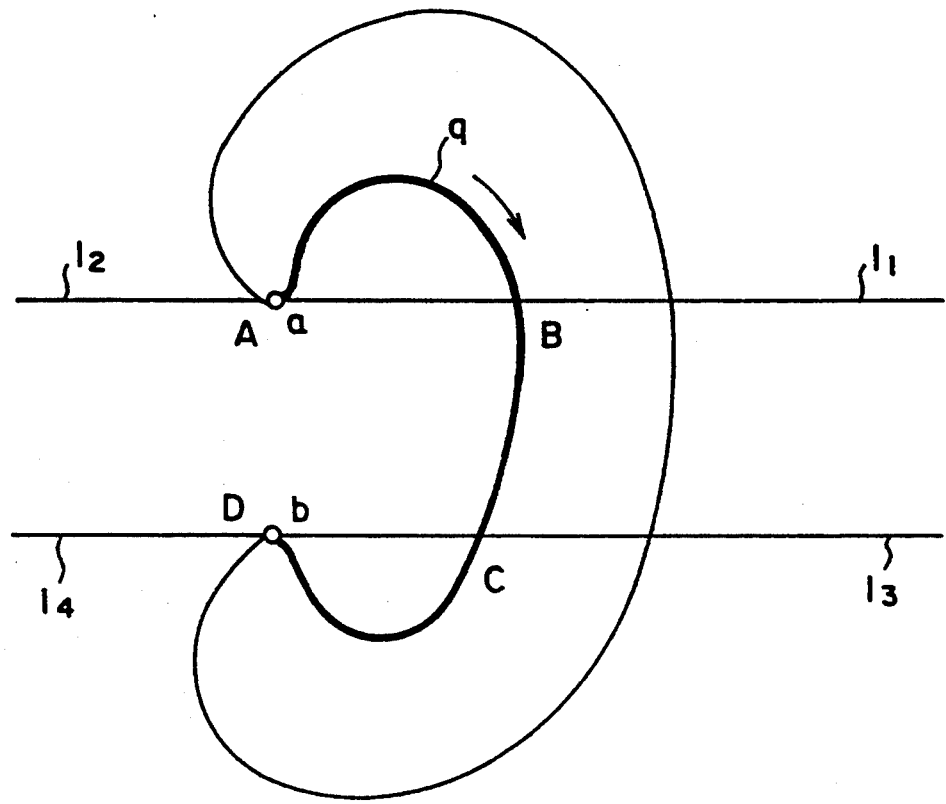

In an image shown in FIG. 22, a half-line 11 extends from an extremal point a rightward, a half-line 12 extends from the extremal point a leftward, a half-line 13 extends from an extremal point b rightward, and a half-line 14 extends from the extremal point b leftward. A pair of the extremal points a and b is the switching pair a-b. The half-lines 11 and 12 do not include the extremal point a, and the half-lines 13 and 14 do not include the extremal point b. When an arc q is traced from the extremal point a to the extremal point b in the positive direction, the rotation value r is calculated in accordance with the following formula.

$$r = U(11,q) + U(14,q) - U(12,q) - U(13,q)$$

In the example shown in FIG. 22, U(11,q)=−1, U(12,q)=0, U(13,q)=−1, and U(14,q)=0. Thus, in this case, the rotation value r is equal to "0" (r=0). In an example shown in FIG. 23, U(11,q)=1, U(12,q)=−1, U(13,q)=0, and U(14,q)=0. Thus, the rotation value is equal to "2" (r=2).

If the arc q is traced from the extremal point a to the extremal point b in the negative direction substituted for the positive direction, the same rotation value r as in the case of the positive direction can be obtained. In addition, if the value U(1,q) is defined under a condition in which the start point of the curve q is counted and the end point of the curve q is not counted as a point at which the curve q crosses the half-line 1, the same rotation value r as in the above case can be obtained.

The curl value is calculated as follows.

Figures 23, 24:
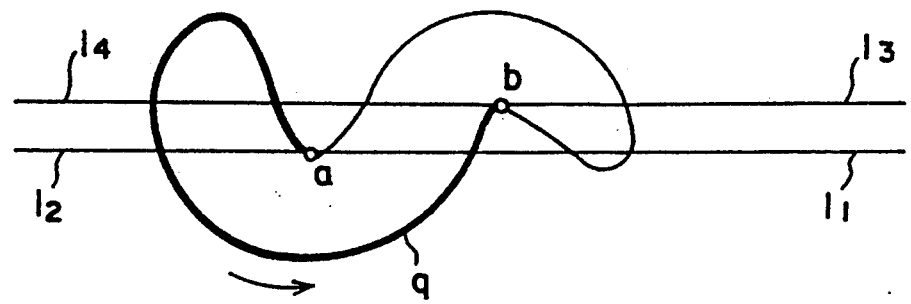
FIG. 24 is a conversion table to be used for obtaining a curl value based on the rotation value r.
Figure 25A:
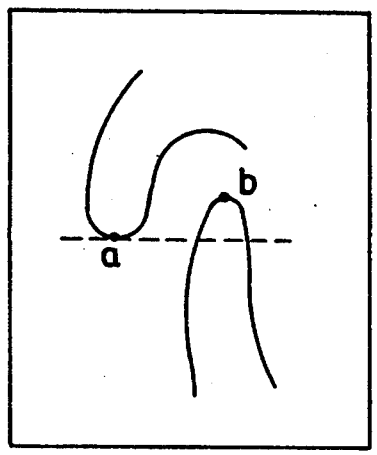
FIGS. 25A, 25B, 25C and 25D are diagram illustrating curl values for various types of switching pairs.
Figure 25B:
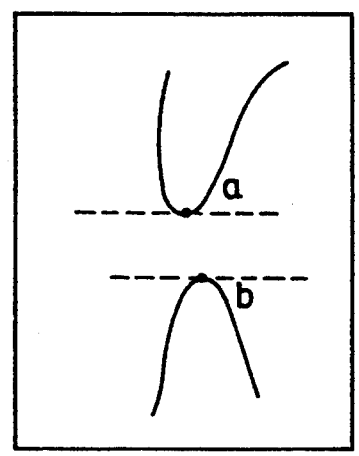
Figure 25C:
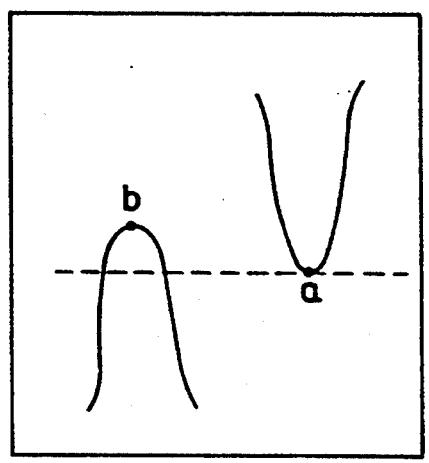
Figure 25D:
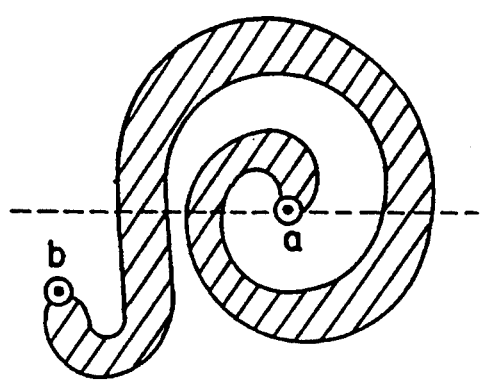

The curl value m is defined using the rotation value r as follows;

$$m = sgn(r) \lceil |r|/2 \rceil$$

where sgn(r) indicates a sign of r, |r|/2 is an absolute value of r/2, and $\lceil |r|/2 \rceil$ is an integer obtained by a round-up operation to |r|/2. When the sign of r is positive, sgn(r)=1, and when r=0, sgn(r)=0, and when the sign of r is negative, sgn(r)=−1. FIG. 24 shows values of sgn(r), |r|/2, and $\lceil |r|/2 \rceil$ under a condition in which the rotation value r is within a range between −4 and 4. FIGS. 25A and 25B indicate curl values m for switching pairs. FIG. 25A shows a case where a position of an extremal point a of the type d is lower than a position of an extremal point b of the type p and the extremal point a is positioned at the left side of the extremal point b. In this case, the curl value m for the switching pair a-b is equal to "1" (m=1). FIG. 25B shows a case where a position of an extremal point a of the type d is higher than a position of an extremal point b of the type p. In this case, the curl value m for the switching pair a-b is equal to "0" (m=0). FIG. 25C shows a case where a position of an extremal point a of the type d is lower than a position of an extremal point b of the type p and the extremal point a is positioned at the right side of the extremal point b. In this case, the curl value for the switching pair a-b is equal to "−1" (m=−1). In a case shown in FIG. 25D, the curl value m for the switching pair a-b is equal to "2" (m=2).

The curl value m is uniformly calculated based on the rotation value r. A part of information which can be described by the rotation value r is not included in the curl value m. The classification of figures (images) using the curl value m is rougher than the classification of figures using the rotation value r. Images described using the above dp code (d, p, ∩, ∪) can be described using the curl value m (the rotation value r) further in detail.

Figure 26:
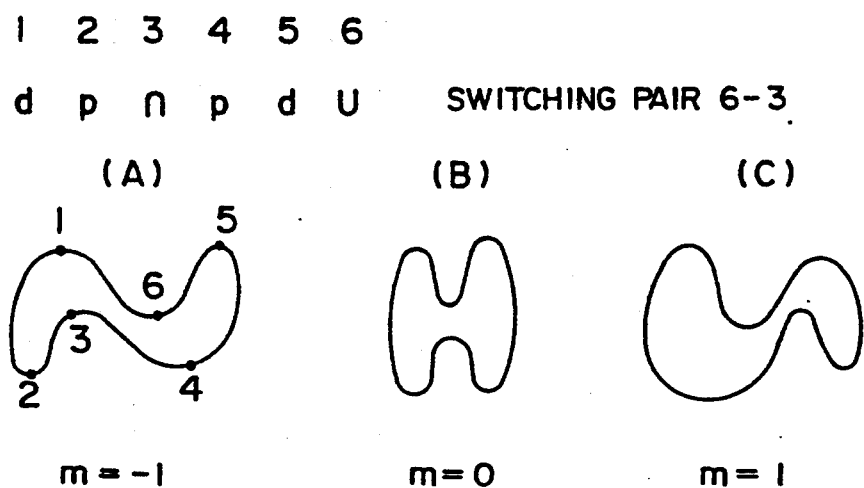
FIG. 26 (A), (B) and (C), FIG. 27 (A), (B) and (C), and FIG. 28 (A,), (B), (C), (D) and (E) are illustrating diatram illustrating images classified using the curl values m.
Figure 27:
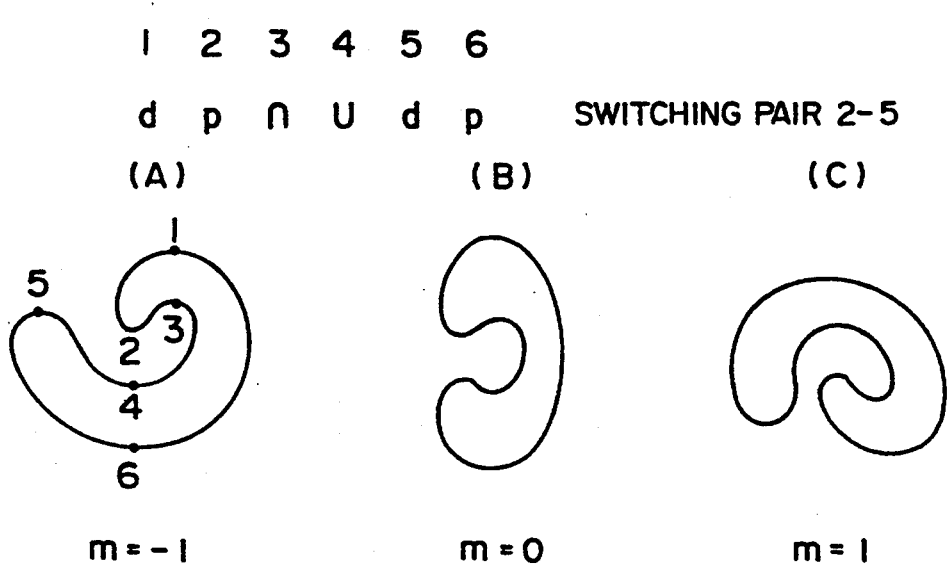

All images shown in FIG. 26 (A), (B) and (C) are described by a code (d p ∩ p d ∪). Each of the images shown in FIG. 26 (A), (B) and (C) has a switching pair 6-3. The curl values m for the switching pair 6-3 in the cases shown in FIG. 26 (A), (B) and (C) are respectively equal to "−1", "0" and "1" (m=−1, m=0 and m=1). That is, even if the images shown in FIG. 26 (A), (B) and (C) are similarly described using the dp code, they are distinguished by the curl value m for a switching pair 6-3. Images shown in FIG. 27 (A), (B) and (C) which images are described by the same code (d p ∩ ∪ d p) are also distinguished by the curl value m for a switching pair 2-5.

Figures 30, 31:
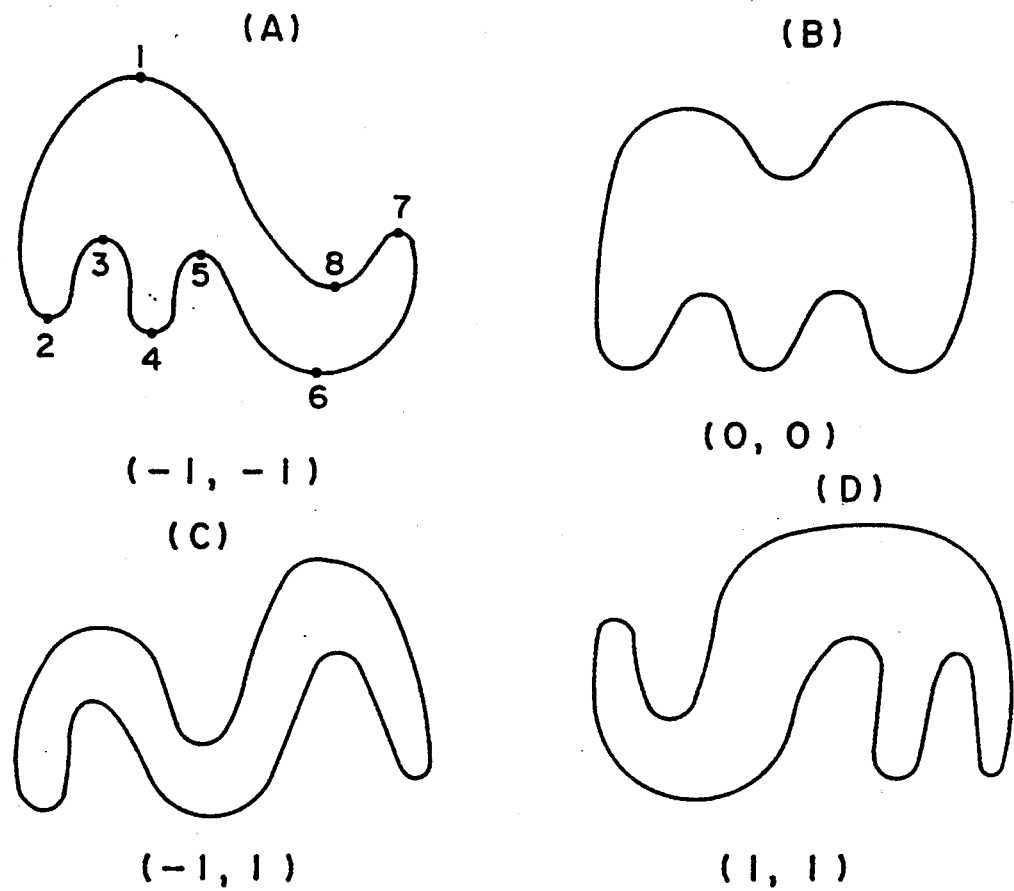
FIG. 30 (A), (B), (C) and (D) are diagrams illustrating images classified using the curl value m.
FIG. 31 is a table illustrating curl values which can be combined with each other in a case shown in FIG. 30 (A), (B), (C) and (D).
Figure 32:
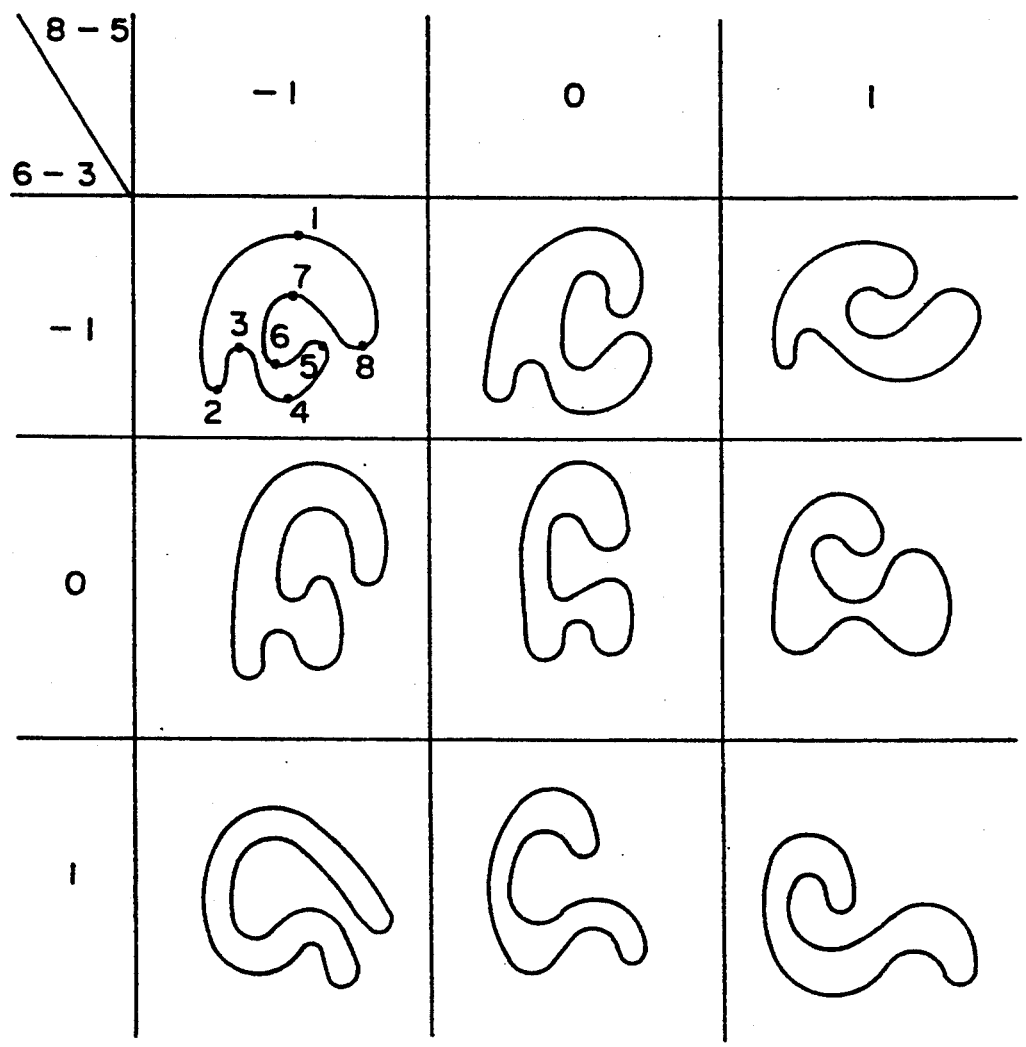
FIG. 32 is a diagram illustrating images classified using the curl value m.

Five images shown in FIG. 28 (A), (B), (C), (D) and (E) are described by the same code (d p d p d ∪ ∩ ∪), and they are distinguished by a combination of curl values for switching pairs 4-1 and 2-5. In FIG. 28, (m1,m2) indicates a combination of the curl values, and m1 is a curl value for the switching pair 4-1, and m2 is a curl value for the switching pair 2-5. FIG. 29 shows curl values which can be combined with each other. Four images shown in FIG. 30 (A), (B), (C) are described by the same code (d p ∩ p ∩ p d ∪), and they are distinguished by a combination of curl values for switching pairs 8-3 and 8-5. FIG. 31 shows curl values which can be combined with each other. Nine images shown in FIG. 32 are described by the same code (d p ∩ p d ∪ ∩ p), and they are distinguished by a combination of curl values for switching pairs 6-3 and 8-5.

Figure 33:
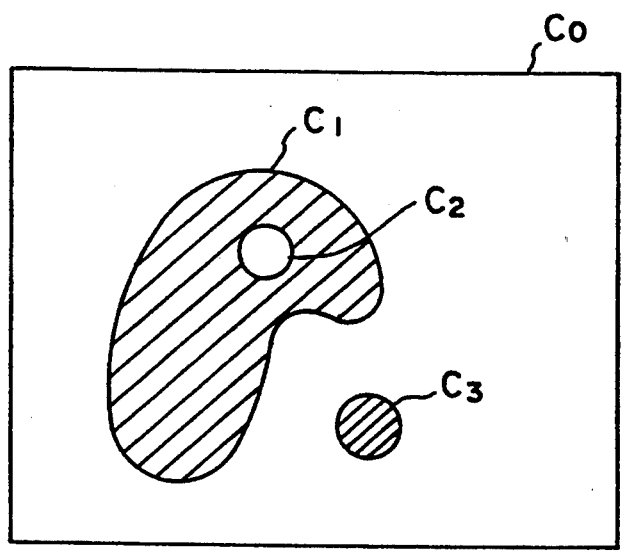
FIG. 33 is a diagram illustrating an example of an image to be described by the dp code.
Figure 34:
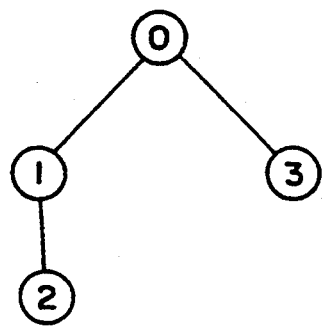
FIG. 34 is a diagram illustrating a tree structure indicating relationships among the contours forming the image shown in FIG. 33.

The dp code and the curl value can describe only a closed curve (a contour). Thus, in a case where an image having a plurality of contours is described, relationships among the contours are further used for describing the image. The relationships among the contours are indicated, for example, by a tree structure as described above. In an image having contours C1, C2 and C3 as shown in FIG. 33, the relationships among a contour C0 of the background and the contours C1, C2 and C3 are indicated by a tree structure shown in FIG. 34.

The character recognition portion 105 recognizes a hand-written numeral as follows.

It is determined, using the dp code or the dp code and the curl value m, which one of large scale classes a binary-valued image corresponding to image signals output from the scanner 13 belongs to. It is further determined, using a discriminant for coordinates of extremal points, which one of medium classes the binary-valued image determined to belong to one of the large classes. Last, it is further determined, using a shape of a part of the binary-valued image (using, for example, direction codes proposed by the applicant in Japanese Patent application No.4-52213)), which one of detailed classes the binary-valued image determined to belong to one of the medium scale classes.

The present invention is not limited to the aforementioned embodiments, and variations and modifications may be made without departing from the scope of the claimed invention.

What is claimed is:

1. A method for describing a character image based on its contours, to classify the character image for character recognition based on a resulting contour-based description of the character image, the method carried out by an apparatus having (1) a read-write memory and (2) a central processing unit (CPU) which controls how binary image data representing the character image is written to and read from the read-write memory, the method comprising the steps of:

(a) extracting one or more contours of the image by reading into the CPU, binary image data previously written into the read-write memory, so as to arrive at contour data;

(b) tracing each of the contours in a predetermined direction by using the CPU to process the contour data;

(c) detecting a maximal point and a minimal point from the contour data, by using the CPU; wherein:

c1) the maximal point is defined as a domain A formed of one or more points on the contour C of the image on an X-Y coordinate system satisfying the conditions:

$$\forall p \in A, y(p) = a \qquad 1)$$

$$\exists N(A), \forall p \in N(A) \cap A^C \cap C, y(p) < a; \qquad 2)$$

c2) the minimal point is defined as a domain A formed of one or more points on the contour C of the image on the X-Y coordinate system satisfying the conditions:

$$\forall p \in A, y(p) = a \qquad 3)$$

$$\exists N(A), \forall p \in N(A) \cap A^C \cap C, y(p) > a; \qquad 4)$$

c3) p indicates a point on the contour,
c4) a is a constant,
c5) y(p) is a y-coordinate value of the point p,
c6) N(A) indicates a neighborhood of the domain A, and
c7) $A^C$ indicates a complementary set of the domain A;

(d) using the CPU, arranging codes according to an order detected in the detecting step, to arrive at an ordered arrangement of the codes including a first type of code indicating the maximal point and a second type of code indicating the minimal point, so that each contour of the image is described by the ordered arrangement; and (e) carrying out a classification of the character image by using the CPU to process the ordered arrangement, to arrive at a character recognition result based on the classification.

2. The method as claimed in claim 1, wherein a convex type of code and a concave type of code both of which belong to said first type of code are distinguished from each other in the arrangement of said first type of code in said step (d), said convex type of code indicating the maximal point on the contour of a convex part of the image, and said concave type of code indicating the maximal point on the contour of a concave part of the image.

3. The method as claimed in claim 2, wherein a convex type of code and a concave type of code both of which belong to said second type of code are distinguished from each other in the arrangement of said second type of code in said step (d), said convex type of code indicating the minimal point on the contour of a convex part of the image, and said concave type of code indicating the minimal point on the contour of a concave part of the image.

4. The method as claimed in claim 3, further comprising a step of:

(e) computing a third type of code indicating for indicating a state of a switching pair which is a pair of a maximal point and a minimal point on the contours, the maximal point and the minimal point satisfying conditions (1) and (2);

$$N_+(a;b) = \pm 2 \text{ (either } +2 \text{ or } -2) \qquad (1)$$

$$N_-(a;b) = \pm 2 \text{ (either } +2 \text{ or } -2) \qquad (2)$$

where a indicating the minimal point and b indicating the maximal point and $N_+(a;b)$ and $N_-(a;b)$ are defined as, $$N_+(a;b) = N_{+1} - N_{+2}$$

$$N_-(a;b) = N_{-1} - N_{-2}$$

where $N_{+1}$ is a number of points belonging to the convex type of code which points are obtained when the contour is traced from the minimal point a to the maximal point b in a first direction, $N_{+2}$ is a number of points belonging to the concave type of code which points are obtained when the contour is traced from the minimal point a to the maximal point b in the first direction, $N_{-1}$ is a number of points belonging to the convex type of code which points are obtained when the contour is traced from the minimal point a from the maximal point in a second direction opposite to the first direction, and $N_-$ is a number of points belonging to the concave type of code which points are obtained when the contour is traced from the minimal point a from the maximal point b in the second direction, whereby each contour of the image is described by the first, second and third types of code.

5. A system for describing a character image based on its contours, to classify the character image for character recognition based on a resulting contour-based description of the character image, the system comprising:
A) a read-write memory; and
B) a central processing unit (CPU) which controls how binary image data representing the character image is written to and read from the read-write memory, the CPU including:
  (a) means for extracting one or more contours of the image by reading into the CPU, binary image data previously written into the read-write memory, so as to arrive at contour data;
  (b) means for tracing each of the contours in a predetermined direction by using the CPU to process the contour data;
  (c) means for detecting a maximal point and a minimal point from the contour data, by using the CPU; wherein:
    c1) the maximal point is defined as a domain A formed of one or more points on the contour C of the image on an X-Y coordinate system satisfying the conditions:

$\forall p \in A, y(p) = a$   1)

$\exists N(A), \forall p \in N(A) \cap A^C \cap C, y(p) < a;$   2)

c2) the minimal point is defined as a domain A formed of one or more points on the contour C of the image on the X-Y coordinate system satisfying the conditions:

$\forall p \in A, y(p) = a$   1)

$\exists N(A), \forall p \in N(A) \cap A^C \cap C, y(p) > a;$   2)

c3) p indicates a point on the contour,
    c4) a is a constant,
    c5) y(p) is a y-coordinate value of the point p,
    c6) N(A) indicates a neighborhood of the domain A, and
    c7) $A^C$ indicates a complementary set of the domain A;
  (d) means for arranging codes according to an order detected in the detecting means, to arrive at an ordered arrangement of the codes including a first type of code indicating the maximal point and a second type of code indicating the minimal point, so that each contour of the image is described by the ordered arrangement; and
  (e) means for carrying out a classification of the character image by using the CPU to process the ordered arrangement, to arrive at a character recognition result based on the classification.

6. The method as claimed in claim 5, wherein said first type of code comprises a convex type of code and a concave type of code, said convex type of code indicating the maximal point on the contour of a convex part of the image, and said concave type of code indicating the maximal point on the contour of a concave part of the image.

7. The method as claimed in claim 6, wherein said second type of code comprises a convex type of code and a concave type of code, said convex type of code indicating the minimal point on the contour of a convex part of the image, and said concave type of code indicating the minimal point on the contour of a concave part of the image.

8. The method as claimed in claim 7, further comprising a step of:
computing means for computing a third type of code indicating for indicating a state of a switching pair which is a pair of a maximal point and a minimal point on the contours, the maximal point and the minimal point satisfying conditions (1) and (2);

$N_+(a;b) = \pm 2$ (either +2 or −2)   (1)

$N_-(a;b) = \pm 2$ (either +2 or −2)   (2)

where a indicating the minimal point and b indicating the maximal point and $N_+(a;b)$ and $N_-(a;b)$ are defined as, $N_+(a;b) = N_{+1} - N_{+2}$ $N_-(a;b) = N_{-1} - N_{-2}$ where $N_{+1}$ is a number of points belonging to the convex type of code which points are obtained when the contour is traced from the minimal point a to the maximal point b in a first direction, $N_{+2}$ is a number of points belonging to the concave type of code which points are obtained when the contour is traced from the minimal point a to the maximal point b in the first direction, $N_{-1}$ is a number of points belonging to the convex type of code which points are obtained when the contour is traced from the minimal point a from the maximal point in a second direction opposite to the first direction, and $N_-$ is a number of points belonging to the concave type of code which points are obtained when the contour is traced from the minimal point a to the maximal point b in the second direction, whereby each contour of the image is described by the first, second and third types of code.

* * * * *